United States Patent
Hutter et al.

(10) Patent No.: US 11,558,909 B2
(45) Date of Patent: Jan. 17, 2023

(54) METHOD OF OPERATING A SENSOR AND/OR INFORMATION SYSTEM AND SENSOR AND/OR INFORMATION SYSTEM

(71) Applicant: Workaround GmbH, Munich (DE)

(72) Inventors: Joe Hutter, Munich (DE); Sebastian Petruch, Munich (DE); Emil Suleymanov, Munich (DE); Patrick Blitz, Munich (DE); Dhananjay Gundapu Jayakrishnan, Munich (DE)

(73) Assignee: Workaround GmbH, Munich (DE)

( * ) Notice: Subject to any disclaimer, the term of this patent is extended or adjusted under 35 U.S.C. 154(b) by 113 days.

(21) Appl. No.: 16/925,661

(22) Filed: Jul. 10, 2020

(65) Prior Publication Data
US 2021/0014910 A1 Jan. 14, 2021

(30) Foreign Application Priority Data
Jul. 12, 2019 (DE) ..................... 10 2019 118 969.1

(51) Int. Cl.
| | | |
|---|---|---|
| *H04W 4/00* | (2018.01) | |
| *H04W 76/11* | (2018.01) | |
| *H04W 76/34* | (2018.01) | |
| *H04W 84/12* | (2009.01) | |
| *H04W 4/80* | (2018.01) | |

(52) U.S. Cl.
CPC ............ *H04W 76/11* (2018.02); *H04W 76/34* (2018.02); *H04W 4/80* (2018.02); *H04W 84/12* (2013.01)

(58) Field of Classification Search
CPC ........ H04W 76/11; H04W 4/80; H04W 76/34
USPC ........................................................ 370/328
See application file for complete search history.

(56) References Cited

U.S. PATENT DOCUMENTS

| | | | |
|---|---|---|---|
| 10,537,143 B2* | 1/2020 | Guenther | A61B 5/681 |
| 11,093,725 B2* | 8/2021 | Mistkawi | G06K 7/10891 |
| 11,206,699 B2* | 12/2021 | Seigel | H04W 76/11 |
| 11,238,683 B1* | 2/2022 | Mars | H04W 12/084 |
| 11,283,937 B1* | 3/2022 | Svendsen | G06V 40/172 |
| 2007/0073842 A1* | 3/2007 | Uehara | H04W 4/08 710/9 |
| 2010/0234182 A1* | 9/2010 | Hoffman | A61F 5/013 482/8 |
| 2012/0025945 A1* | 2/2012 | Yazadi | H04L 67/1095 2/160 |
| 2014/0282923 A1 | 9/2014 | Narayan et al. | |
| 2015/0127737 A1* | 5/2015 | Thompson | H04W 4/21 709/204 |

(Continued)

FOREIGN PATENT DOCUMENTS

| | | |
|---|---|---|
| DE | 102015111506 A1 | 4/2016 |
| DE | 102015224308 A1 | 6/2017 |

(Continued)

*Primary Examiner* — Marceau Milord
(74) *Attorney, Agent, or Firm* — Dilworth IP, LLC

(57) ABSTRACT

A method of operating a sensor and/or information system which includes at least one main device, in particular a smart device, and at least one secondary device, the method including setting up a wireless communication connection between one of the at least one main device and one of the at least one secondary device using a setup identifier, and discarding the used setup identifier by the secondary device and/or by the main device upon or after termination of the communication connection. A sensor and/or information system is furthermore shown.

20 Claims, 2 Drawing Sheets

(56) References Cited

U.S. PATENT DOCUMENTS

| | | | | |
|---|---|---|---|---|
| 2015/0257733 A1* | 9/2015 | Corbett, III | .......... | A61B 8/4455 |
| | | | | 600/443 |
| 2015/0286976 A1* | 10/2015 | Hirschfeld | .......... | H04L 63/0442 |
| | | | | 705/7.26 |
| 2015/0288666 A1* | 10/2015 | Rao | ........ | G16H 40/20 |
| | | | | 713/171 |
| 2015/0355909 A1* | 12/2015 | Sallas | .......... | G06F 9/4411 |
| | | | | 713/100 |
| 2015/0375042 A1* | 12/2015 | Schaffer | .......... | A61B 5/6803 |
| | | | | 482/8 |
| 2016/0018901 A1* | 1/2016 | Woolley | .......... | G06F 3/011 |
| | | | | 345/156 |
| 2016/0161301 A1* | 6/2016 | Guenther | .......... | A61B 5/6825 |
| | | | | 702/150 |
| 2016/0284236 A1* | 9/2016 | Bavunoglu | .......... | G09B 21/04 |
| 2017/0119553 A1* | 5/2017 | Cipriani | .......... | A61F 2/76 |
| 2018/0326592 A1 | 11/2018 | Kogan | | |
| 2018/0351962 A1* | 12/2018 | Kulkarni | .......... | H04W 12/64 |
| 2019/0064791 A1* | 2/2019 | Celia | .......... | G06N 3/088 |
| 2021/0067935 A1* | 3/2021 | Amaral Costa | .......... | G06F 21/30 |
| 2022/0116270 A1* | 4/2022 | Matsumura | .......... | G06F 9/541 |
| 2022/0116856 A1* | 4/2022 | Xiao | .......... | H04W 12/08 |

FOREIGN PATENT DOCUMENTS

| | | |
|---|---|---|
| DE | 102017203495 A1 | 9/2018 |
| EP | 2693689 A1 | 2/2014 |

* cited by examiner

METHOD OF OPERATING A SENSOR AND/OR INFORMATION SYSTEM AND SENSOR AND/OR INFORMATION SYSTEM

FIELD OF THE DISCLOSURE

The disclosure relates to a method of operating a sensor and/or information system and to a corresponding sensor and/or information system.

BACKGROUND

Systems having portable secondary devices, for example sensor modules, such as barcode scanners, or portable display units including screens are known. In such systems, the secondary devices usually communicate with a main device which controls the flow of data to and from the secondary devices.

Usually, wireless communication connections are used, so that the secondary devices must be connected to the correct main device.

In particular in environments where many sensor and/or information systems are used, such as a logistics center or a production line where every worker wears such a system, connecting the portable modules to the right main device is a major challenge.

SUMMARY

Thus, there is the need to provide a method of operating a control and/or information system and a control and/or information system in which the connection of devices to the main device is possible in a simple and reliable manner.

The object is achieved by a method of operating a sensor and/or information system which includes at least one main device, in particular a smart device, and at least one secondary device, the method comprising the following steps:
  a) setting up a wireless communication connection between one of the at least one main device and one of the at least one secondary device using a setup identifier, and
  b) discarding the used setup identifier by means of the secondary device and/or the main device on or after termination of the communication connection.

Due to the discarding of the setup identifier on or after termination of the communication connection, it is ensured that all devices have "forgotten" previous connections and therefore do not attempt to again set up a connection to a previously connected device though this is not desired. It is thus ensured that only those secondary devices where the connection is desired are connected to the main device.

Within the context of the present disclosure, "discard" means both the deletion and the shifting, marking or similar measures which prevent further use of the setup identifier.

Re-establishing a communication connection of the secondary device, even with the same main device, is for example only possible by using a different setup identifier.

In particular, MAC addresses or other static identifiers of the devices do not constitute a setup identifier within the meaning of the disclosure.

For example, the setup identifier is discarded at the latest before the next wireless communication connection is set up.

In one configuration of the disclosure, the communication connection is terminated if the secondary device and/or the main device does not receive any activity request from another device or from the user for a predetermined period of time, is inserted into a charging station, is connected to a charging cable, receives a disconnection request from the user and/or a new secondary device of the same device class is connected. This ensures that the communication connection is reliably terminated when the devices are no longer in use.

An activity request is, for example, the actuation of an actuating element of the device, for example to read a barcode, or a signal transmitted via the wireless communication connection to activate functions such as the display of information on the screen.

The secondary devices can be divided into device classes according to their design and function, for example into sensor modules and display modules. In particular, a device class consists of the set of devices of identical construction.

For example, when the communication connection is terminated, at least the transmit function and in particular also the receive function of a wireless communication module of the secondary device and/or of the main device is deactivated, thus avoiding disturbances of other devices.

To ensure that only the secondary device desired at that moment can be coupled to the main device, it is possible to prevent the main device from seeking a connection to the secondary device by means of an identifier other than the setup identifier and/or by means of a static identifier, in particular the MAC address, or vice versa.

Holding of the connection, even in case of short-term interruptions of the connection, can be realized by means of a static identifier.

In one embodiment of the disclosure, the setup identifier contains a friendly name and/or an SSID, and/or the wireless communication connection is a Bluetooth connection, in particular a Bluetooth Low Energy connection, a WLAN connection or a mobile radio connection (5G). Thus, a parameter is used which can be modified easily.

To set up the wireless communication connection between one of the at least one main device and one of the at least one secondary device, the following steps are for example performed:
  a) generating a setup identifier, in particular by means of the main device or the secondary device,
  b) transmitting the setup identifier to the secondary device and/or the main device,
  c) establishing the wireless communication connection between the main device and the secondary device using the setup identifier.

In this way, it is ensured that only those devices between which the setup identifier has been transmitted can set up a communication connection.

In particular, the setup identifier used differs from the previously used setup identifier. The setup identifier is for example generated randomly. Furthermore, the setup identifier is in particular unique.

In one variant embodiment, the wireless communication connection is established in that the secondary device or the main device indicates a connection readiness by sending the setup identifier and in that the main device or the secondary device searches for a device that sends the setup identifier in order to establish the wireless communication connection with this device. It is thus possible to use the usual configuration protocols ("handshake") of the respective connection standard.

For example, the setup identifier is transmitted optically, the setup identifier being in particular encoded in a one- or multi-dimensional barcode and the barcode being read in optically for transmission, thus preventing unintentional or unconscious transmission of the setup identifier to other, unwanted devices.

The barcode is in particular read in using the device by means of which the wireless communication connection is to be set up.

A multidimensional barcode is for example a 2D code, a QR code or a DataMatrix code.

In one embodiment of the disclosure, the main device includes a display and the secondary device includes a reading unit, in particular a bar code reader, the main device generating the setup identifier, and the main device displaying the setup identifier by means of the display for transmitting the setup identifier, and the secondary device reading in the setup identifier by means of the reading unit. In this way, the connection can be set up quickly and easily.

Alternatively or additionally, the secondary device includes a screen and the main device includes a reading unit, in particular a camera or a barcode reader, the secondary device generating the setup identifier, and the secondary device displaying the setup identifier by means of the screen for transmitting the setup identifier, and the main device reading in the setup identifier by means of the reading unit. In this way, a user-friendly coupling of the devices is also possible.

In order to have the secondary device always ready for use, the secondary device is worn on the body of a user, in particular by means of an article of clothing, in particular a glove or a wristband.

In one embodiment, the main device is a smart device including an operating system and an application, the application controlling the setting up of the wireless communication connection. It is thus possible to ensure that the setup identifier is correctly discarded.

In particular, the main device is a smart phone, a tablet or a laptop. Accordingly, the typical computing power and memory of such devices are also available to the main device.

It is also conceivable that the main device is a stationary computer or a server that can be accessed in particular via an Internet connection, i.e. a so-called cloud server.

The application for example manages the setup identifier, possibly an identifier other than the setup identifier and/or a static identifier of the secondary device, in particular the MAC address of the secondary device.

In particular, the application prevents the operating system from permanently storing the setup identifier, possibly an identifier other than the setup identifier and/or a static identifier of the secondary device, in particular the MAC address.

The application for example directly addresses the communication module or the low-level parts of the operating system to control the communication module, such as a Bluetooth stack.

The high-level parts of the operating system, which are intended for controlling the connection behavior and for automatic connection, are for example not used or are bypassed by the application. The high-level parts therefore do not receive any information about a static identifier of the secondary device.

The static identifier, such as the MAC address, for example, is only held during the connection itself and only in the application itself. The low-level parts of the operating system which maintain the connection—i.e. the Bluetooth stack—are of course used for this purpose and only receive the static identifier for this purpose.

The object is further achieved by a sensor and/or information system, including a main device, in particular a smart device, and at least one secondary device, the sensor and/or information system being configured so as to carry out a previously described method.

The features and advantages explained as to the method apply equally to the sensor and/or information system and vice versa.

The sensor and/or information system is for example an industrial sensor and/or information system, i.e. designed for permanent use in industry.

In one embodiment, the sensor and/or information system comprises an article of clothing, in particular a glove or a wristband, which is configured to attach the secondary device to the body of the user, the article of clothing having in particular an actuating element which is connected to the secondary device such that it can actuate the secondary device.

In this way, the secondary device is always available and in particular very easy to operate.

The actuating element is connected to the secondary device, for example by means of at least one cable and at least one contact.

BRIEF DESCRIPTION OF THE DRAWINGS

Further advantages and features will become apparent from the description below and from the attached drawings to which reference is made and in which.

DETAILED DESCRIPTION

Lists having a plurality of alternatives connected by "and/or", for example "A, B and/or C" are to be understood to disclose an arbitrary combination of the alternatives, i.e. the lists are to be read as "A and/or B and/or C". The same holds true for listings with more than two items.

Figure 1:
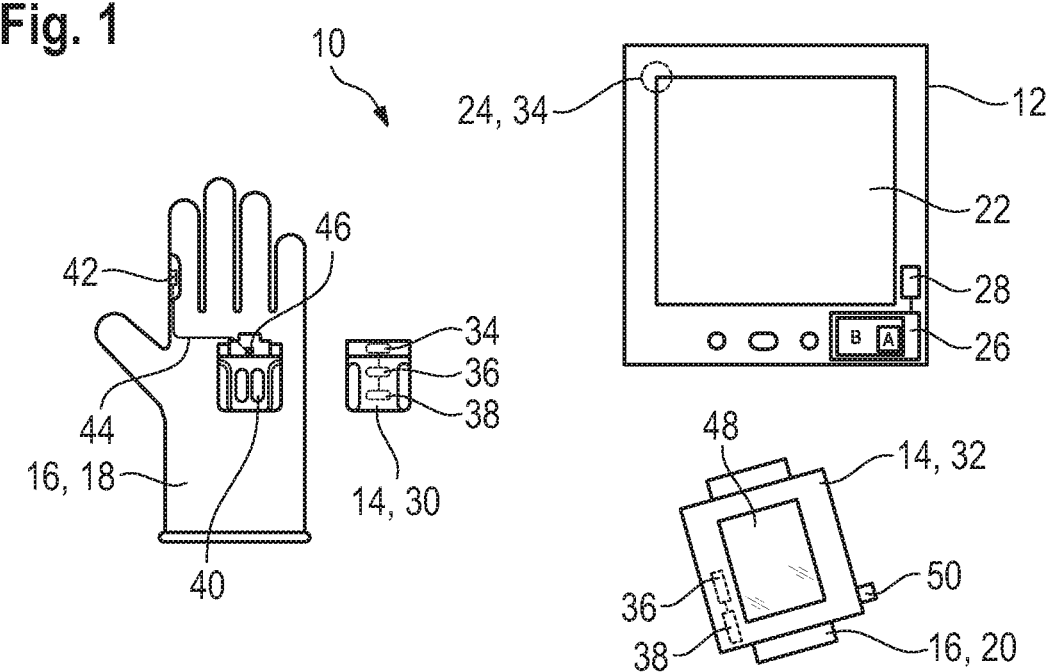
FIG. 1 shows a sensor and/or information system according to the disclosure in an unworn condition.

FIG. 1 schematically shows a sensor and/or information system 10 according to the disclosure which includes a main device 12, two secondary devices 14 as well as articles of clothing 16, here a glove 18 or a wristband 20.

The sensor and/or information system 10 is configured for industrial use and therefore has a corresponding robustness for continuous operation.

The main device 12 is a smart device, for example a smartphone, a tablet or even a laptop.

The main device 12 includes a display 12, a camera 24, a control unit 26 and a communication module 28.

The communication module 28 is configured for communication using the Bluetooth standard, in particular the Bluetooth Low Energy standard or the WLAN standard.

The control unit 24 has an operating system B on which an application A of the sensor and/or information system 10 is executed.

In the example embodiment shown, the sensor and/or information system 10 has a first secondary device 14, which is a sensor module 30, and a second secondary device 14, which is a display module 32.

The sensor module 30 has an optical reading unit 34, which is a barcode scanner in the example embodiment shown, a control unit 38 and a communication module 38. Optionally, the sensor module 30 can include a screen.

It is also conceivable that the sensor module 30 has other sensors, such as an RFID reader, touch sensors or acceleration sensors in addition to or instead of the reading unit 34. The display module 30 can also include such sensors.

The sensor module 30 can be fastened to the body of a user U using the glove 18.

For this purpose, the glove 18 has a receptacle 40.

The glove 18 can also have an actuating element 42, for example a button for the secondary device 14.

By means of cables 44 and contact elements 46 in the receptacle 40, the actuating element 42 is connected to the secondary device 14 as soon as it is inserted in the receptacle 40.

The display module 32 has a screen 48 and also a control unit 36 including a communication module 38.

In addition, an actuating element 50 is provided on the display module 32 to actuate the display module 32.

The display module 32 can be fastened to the body of the user U by means of the wristband 20.

Alternatively or additionally, the sensor and/or information system can include at least one further secondary device 14, configured as smartglasses 51. In this case, the explanations as to the display module 32 are also applicable.

In the case of the smartglasses 51, "display" is then to be understood as an extended term, namely both as an self-illuminating screen in the area of the lenses and as a projection device which projects an image onto the lenses or somewhere else.

The secondary devices 14 are thus so-called "wearables".

Figure 2:
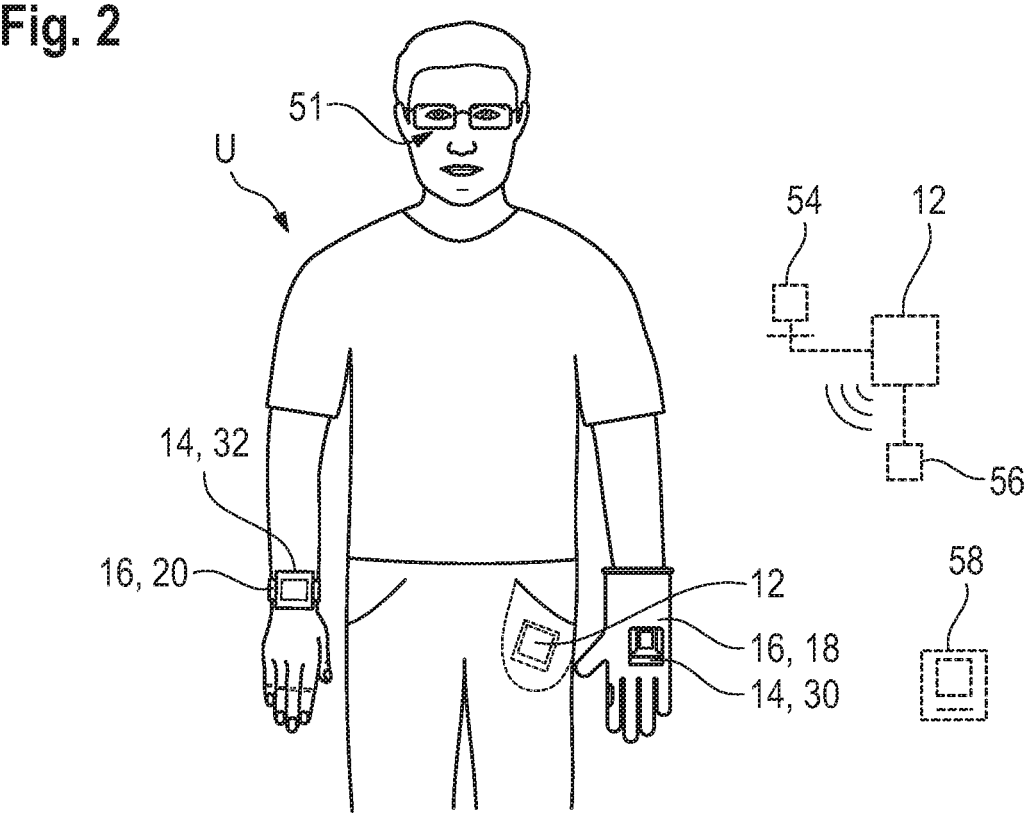
FIG. 2 shows the sensor and/or information system of FIG. 1 while worn by a user.

FIG. 2 shows the user U wearing the sensor and/or information system 10.

The user U wears on his left hand the glove 18 with the first secondary device 14, i.e. the sensor module 30 attached thereto. On his right arm, the user U wears the second secondary device 14, i.e. the display module 32 by means of the wristband 20. In his trouser pocket, the user U wears the main device 12.

The user U is, for example, an assembly worker at a production line or a logistics employee in a warehouse.

At the beginning of a shift, the user U and each of his colleagues take a main device 12 and secondary devices 14 corresponding to his task from the corresponding charging stations.

Figure 3:
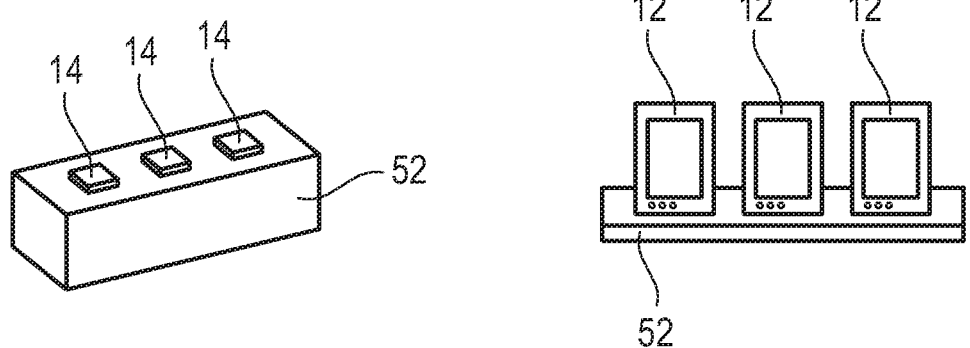
FIG. 3 shows main and secondary devices of sensor and/or information systems according to FIG. 1 in appropriate charging stations.

FIG. 3 shows charging stations 52 for secondary devices 14 and main devices 12, in which the main devices 12 and the secondary devices 14 are inserted for charging.

At the end of each shift at the latest, the user U puts the secondary devices 14 and the main device 12 back into the corresponding charging station 52.

In the charging station 52, the secondary devices 14 are not assigned to any of the main devices 12, so that the sensor and/or information systems 10 can be selected from any of the devices 12, 14. The user U can therefore take any main device 12 and any secondary devices 14 suitable for his task.

Figure 4:
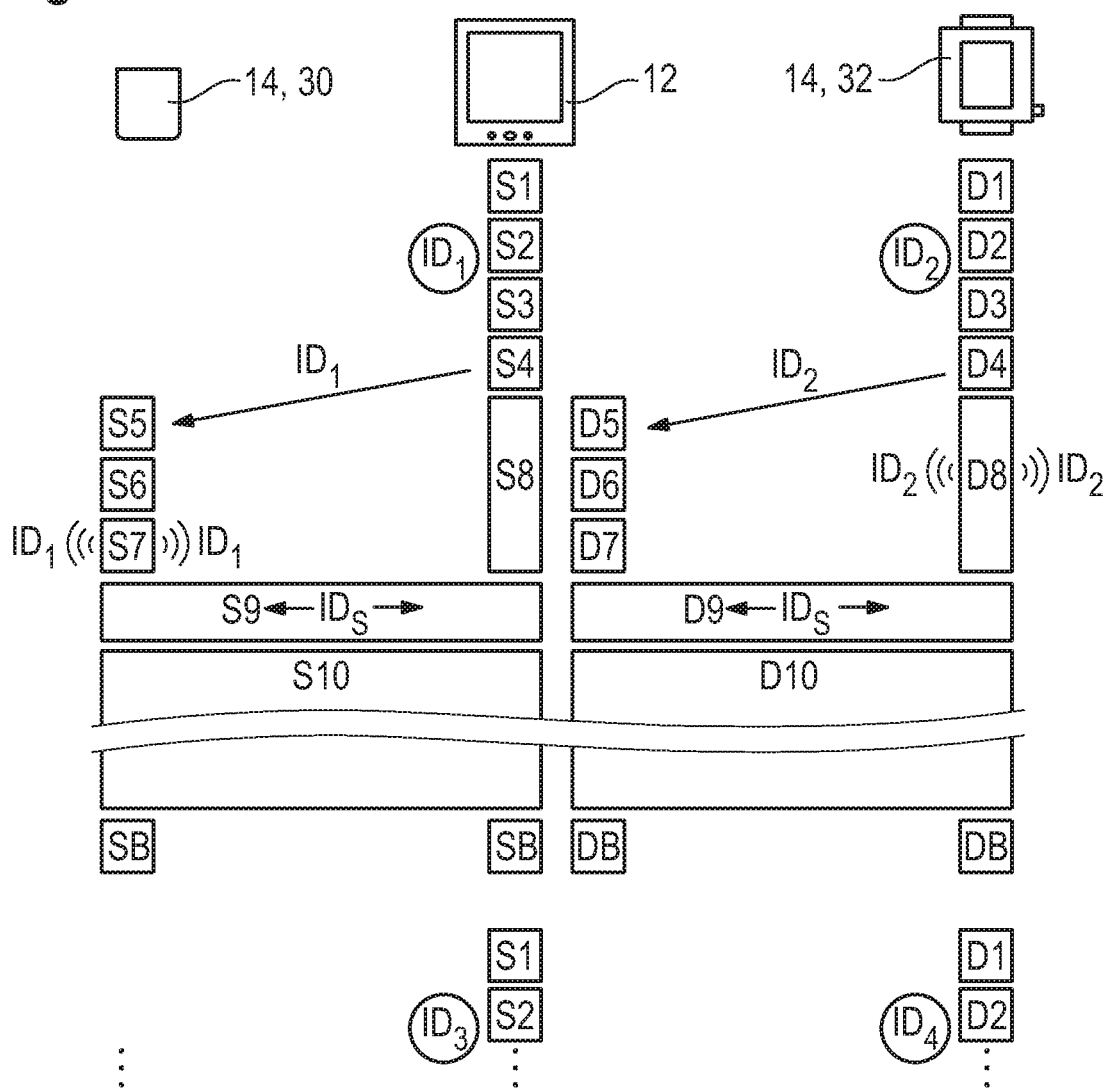
FIG. 4 shows a flow chart of a method according to the disclosure.

In order to connect the secondary devices 14 to the main device 12 and thus to be able to use the sensor and/or information system 10, the secondary devices 14 must set up a wireless communication connection with the main device 12. To this end, the method according to FIG. 4 is carried out.

To connect the first secondary device 14, i.e. the sensor module 30, to the main device 12, the user U starts the connection function of the application A on the main device 12 (step S1).

The control unit 26, for example the application A, now generates a setup identifier $ID_1$ (step S2).

The setup identifier $ID_1$ contains information for the secondary device 14 so that the main device 12 and the secondary device 14 can set up a connection.

For example, the setup identifier $ID_1$ contains a friendly name in case of a Bluetooth connection to be set up or a SSID in case of a WLAN connection to be set up.

The setup identifier and thus the friendly name or the SSID are generated such that they differ from previous setup identifiers already used. This can be achieved with sufficient probability by a random generation of the setup identifiers.

The setup identifier $ID_1$ is therefore unique.

For example, the setup identifier $ID_1$ is a multi-digit alphanumeric character string.

In the context of the present disclosure, this setup identifier $ID_1$ is also referred to as "dynamic setup identifier" because the setup identifier $ID_1$ changes.

The setup identifier $ID_1$ can also be generated by another device, such as a server or stationary computer, and can be transmitted to the main device 12 and/or to the secondary device 14.

The control unit 26 then encodes the setup identifier $ID_1$ into a one- or multi-dimensional barcode (step S3).

A multidimensional barcode is a QR code or a DataMatrix code, for example.

In the next step S4, the barcode is displayed by the control unit 26 on the display 22 of the main device 12.

The user U then directs the optical reading unit 34 of the sensor module 30 to the display 22 of the main device 12 and triggers a reading-in process, for example by actuating the actuating element 42 in the glove 18 (step 5).

In this way, the barcode and thus the setup identifier $ID_1$ is optically transmitted to the secondary device 14, here the sensor module 30.

The sensor module 30, by means of which the barcode is read in, is of course the sensor module 30 which is intended to establish a wireless communication connection with the main device 12.

In the next step S6, the control unit 36 of the secondary device 14 receives the barcode and decodes the latter so that it receives the setup identifier $ID_1$.

Then, in step S7, the control unit 36 controls the communication module 38 of the secondary device 14 such that the setup identifier, for example the friendly name or SSID, is sent to indicate that the secondary device 14 is ready to connect.

This process is called "advertising" in Bluetooth connections.

Meanwhile, in step S8, the main device 12, or more precisely the control unit 26 using the communication module 28, searches for devices which indicate their readiness for connection by sending the setup identifier $ID_1$. In other words, using the example of a Bluetooth connection, the main device 12 searches for devices that perform advertising with the setup identifier $ID_1$.

For example, the search starts when the setup identifier $ID_1$ is generated, as soon as the barcode has been displayed on the display 22 or at any other time.

As soon as the main device 12 has found the secondary device 14 which sends the setup identifier $ID_1$, in this case the sensor module 30, the main device 12 and the secondary device 14 establish the wireless communication connection (step S9).

This is done, for example, by using the usual configuration process ("handshake") for this type of wireless connection (Bluetooth, WLAN, etc.). During configuration, a static identifier $ID_S$ is for example exchanged between the main device 12 and the secondary device 14, for example the MAC address (Media Access Control address) of the secondary device 14.

The communication connection between the main device 12 and the first secondary device 14, i.e. sensor module 30, is now fully set up and can be used for data transmission (step S10).

The communication connection is then maintained in accordance with the corresponding protocol of the communication connection, usually using the static identifier $ID_S$, even in case of shorter connection interruptions.

During the above steps, the communication module 28 of the main device 12 is controlled by the application A, which thus controls the setting up of the wireless communication connection on the side of the main device 12.

More precisely, the application A directly controls the low-level parts of operating system B for controlling the communication module 28, for example the Bluetooth stack. This means that the high-level parts provided in the operating system B, which are originally intended for controlling the connection behavior and for automatic connection, are bypassed by the application A and are therefore not used.

In other words, only the application A—and not the high-level parts of the operating system B—knows the setup identifier $ID_1$ and the transmitted static identifier $ID_S$ of the secondary device 14. In this way, the application A has the exchanged identifiers in control, as they are not permanently stored in the operating system B.

The static identifier such as the MAC address, is for example only kept during the presence of the wireless communication connection itself and only in the application A itself. The low-level parts of the operating system B which maintain the connection—i.e. the Bluetooth stack—are of course used for this purpose and receive the static identifier $ID_S$ only for this purpose.

The application A also prevents the main device 12 from seeking a connection with the secondary device 14 or other secondary devices using an identifier other than the setup identifier $ID_1$ and/or a static identifier $ID_S$. Conversely, incoming connection requests using these identifiers are also rejected.

For the connection of the second secondary device 14, i.e. the display module 32, the same principle of dynamic setup identifiers is applied, but the setup identifier $ID_2$ used is generated by the secondary device 14.

First, the user U initializes the establishment of a wireless communication connection on the second secondary device 14, i.e. the display module 32, for example by actuating the actuating element 50 (step D1).

Analogous to steps S2 and S3, the control unit 36 of the secondary device 14 generates a previously unused and unique setup identifier $ID_2$ (step D2) and encodes the latter into a barcode (step D3) and displays the barcode on the screen 48 (step D4). This can be achieved with sufficient probability by a random generation of the setup identifier.

In the next step D5, the user U now uses the main device 12 to read in the barcode on the screen 48 of the secondary device 14. To this end, he actuates the camera 24, which thus serves as optical reading unit 34.

It is also conceivable that another, already coupled secondary device 14, such as the sensor module 30, is used to read in the barcode of the secondary device 14 now to be coupled for the main device 12. The coupled secondary device 14 then forms the reading unit 34 of the main device 12 or provides the reading unit 34.

The control unit 26 of the main device 12 then decodes the barcode and thus determines the setup identifier $ID_2$ (step D6).

The application A then causes the communication module 28 to search for devices that indicate readiness for connection by sending the setup identifier $ID_2$ (step D7).

At the same time, the secondary device 14 sends the setup identifier $ID_2$ to indicate readiness for connection. This is for example carried out as soon as the setup identifier $ID_2$ has been generated, the barcode has been displayed on the screen 48 or at another time (step D8).

As in step S9, the main device 12 thus finds the secondary device 14 and sets up the wireless communication connection (step D9), so that in step D10, the wireless communication connection is set up and data can be transmitted.

Of course, the sensor module 30 can also have a screen 48. In this case, the sensor module 30 can set up a communication connection with the main device 12 both through steps S1 to S10 and through steps D1 to D10. This means that either the main device 12 or the sensor module 30 generates the setup identifier $ID_1$.

It is also conceivable that the secondary devices 14 are coupled with the main device 12 in a different order, or that the coupling overlaps, takes place one after the other or simultaneously. The methods for setting up a connection with the two secondary devices 14 have been shown in parallel for illustration purposes only.

In addition, the main device 12 can respectively send the setup identifier $ID_1$, $ID_2$ to indicate the readiness for connection, and the respective secondary device 14 searches for other devices, in particular the main device 12.

It is also conceivable that only one secondary device 14 or more than two secondary devices 14 are connected to the main device 12.

If only one or several sensor modules 30 (without display) are connected to the main device 12, the sensor and/or information system 10 is a pure sensor system. If only one or several display modules 32 are connected to the main device 12, the sensor and information system 10 is a pure information system.

After the use of the sensor and/or information system 10 is completed, for example at the end of a shift, the communication connection is no longer required and can be terminated.

The communication connection is terminated, for example, if one of the devices 12, 14 does not receive any activity request from another device or from the user for a specified period of time. This is also called a timeout.

For example, the secondary device 14 terminates the communication connection if the user has not operated the actuating element 42 or 50 for a specified period of time or if no data has been received from the main device 12 for display on the screen 48 for the specified period of time.

The communication connection is also terminated if one of the devices is inserted into the respective charging station 52 or connected to a charging cable. For example, if a secondary device 14 is inserted into the corresponding charging station 52, this secondary device 14 will terminate the communication connection with the main device 12. However, communication connections between the main device 12 and other secondary devices 14 are maintained.

If the main device 12 is inserted into the charging station 52 or connected with a charging cable, all connections to secondary devices 14 can for example be terminated automatically.

The communication connection can also be terminated at the user's request, i.e. by an explicit command from the user.

It is also conceivable that an existing communication connection with a secondary device 14 is disconnected if another secondary device 14 of the same device classes is connected.

The secondary devices 14 can be divided into device classes according to their design and function, for example into sensor modules and display modules. A device class in particular consists of the set of devices of identical construction.

Values can be specified for the number of secondary devices 14 of a specific device class per sensor and/or information system 10, for example a maximum of one sensor module 30 and a maximum of two display modules 32. If the specified number is exceeded, an existing communication connection is then disconnected.

Upon or shortly after the termination of the communication connection or the last existing communication connection, the sending function of the communication module 38, 28 and also the receive function of the communication module 38, 28 is deactivated by the corresponding control unit 26, 36, in particular for secondary devices 14.

In secondary devices 14, the communication module 38 is thus only reactivated as soon as a corresponding actuating element 42, 50 has been actuated.

It is thus ensured that devices 12, 14 which are not in use do not permanently attempt to establish a connection and thus occupy frequency ranges and interfere with communication connections between other devices.

If the communication connection between a secondary device 14 and the main device 12 is terminated, the respective setup identifier $ID_1$, $ID_2$ is discarded (step SB or DB).

This means that on the side of the secondary device 14, the setup identifier $ID_1$ or $ID_2$ is deleted.

On the side of the main device 12, this means that the application A also deletes the corresponding setup identifier $ID_1$, $ID_2$ or otherwise prevents this setup identifier from being used again. This can be done, for example, by correspondingly marking the setup identifier or shifting the storage location of the setup identifier.

It is ensured that the corresponding setup identifier $ID_1$, $ID_2$ is not used again to set up a communication connection, as the setup identifiers $ID_1$, $ID_2$ or a static identifier were not stored in the operating system B. The corresponding setup identifier is discarded at the latest before the next wireless communication connection is set up.

However, the setup identifier $ID_1$, $ID_2$ is preferably discarded upon or shortly after the termination of the communication connection.

It is thus ensured that the main device 12 and the secondary devices 14 can no longer use information to reestablish a previous, terminated connection. In other words, by discarding the respective setup identifier $ID_1$, $ID_2$, the main device 12 and the secondary devices 14 forget which unit they were previously connected to, so that no misconnections or permanent assignments can occur.

It is therefore irrelevant which main device 12 and which secondary devices 14 are removed from the charging stations 52 by the user U, because after removal from the charging station 52, all secondary devices 14 can be connected to any main device 12.

For a new setting up of a communication connection between the main device 12 and other or the same secondary devices 14, the procedure described above is repeated.

In steps S2 and D2, however, setup identifiers $ID_3$, $ID_4$ are now generated which differ from the previously used setup identifiers $ID_1$, $ID_2$, even if a communication connection is to be set up between the same units 12, 14 as before. This can be achieved with sufficient probability by a random generation of the setup identifiers.

Alternatively or additionally, the main device 12 can be a stationary computer, optionally without input and/or output means, a server or a cloud server. The mentioned stationary main devices 12 are shown as dashed lines in FIG. 2.

In this case, the assignment of the secondary devices 14, which together shall form a sensor and/or information system 10, by means of the main device 12 is necessary. The stationary computer, server or cloud server can in this case simultaneously serve as a main device 12 for several sensor and/or information systems 10.

The coupling of a secondary device 14 with the main device 12, in particular a sensor module 30, can be done as described above for steps S1 to S10.

The output of the setup identifier $ID_1$ can be done, for example, via a stationary display 54 (FIG. 2), which is controlled by the main device 12, a printing device 56 (FIG. 2) and/or via a mobile terminal 58 (FIG. 2), such as a Smartphone, a tablet, or similar. The respective device 54, 56, 58 is then, at least temporarily, to be regarded as display 22 of the main device 12.

It must be noted that when using a mobile terminal 58, the mobile terminal 58 is only used to output the setup identifier $ID_1$ and the communication connection is set up with the main device 12—in this case the stationary computer, server or cloud server —, in particular independently of the mobile terminal 58.

Likewise, to set up the communication connection and/or for unambiguous assignment—as described above in steps D1 to D4—a secondary device 14 can generate and display a setup identifier $ID_2$, which is then read in by a secondary device 14 designed as a sensor module 30 and transmitted to the main device 12.

The main device 12 then assigns the sensor module 30 and the secondary device 14 to each other and, if necessary, establishes a connection with the not yet connected secondary device 14 in the manner described above (steps D5 to D10).

In this case, the sensor module 30 thus takes over the function of the input means of the main device 12, more precisely the sensor module 30 represents or provides the reading unit 34 of the main device 12. Similarly, as described above, the mobile terminal 58 can temporarily serve as reading unit 34 for the main device 12.

The sensor module 30 has been connected to the main device 12 beforehand, wherein to this end, it is possible to use the method described above or a method different from the method described above.

In this case, it is advantageous that the user does not have to carry the main device 12 with him, but merely wears the secondary devices 14.

The invention claimed is:

1. A method of operating of at least one of a sensor system or an information system which includes at least one main device and at least one secondary device, the method comprising the following steps:
   a) setting up a wireless communication connection between one of the at least one main device and one of the at least one secondary device using a setup identifier, the setting up the wireless communication connection including generating the setup identifier, transmitting the setup identifier to at least one of the secondary device or the main device, and establishing the wireless communication connection between the main device and the secondary device by means of the setup identifier, wherein the wireless communication connection is established in that the secondary device or the main device indicates readiness for connection by sending the setup identifier, and the main device or the secondary device, respectively, searches for a device sending the setup identifier to establish the wireless communication connection with this device, and b) discarding the used setup identifier by at least one of the secondary device or the main device upon or after termination of the communication connection.

2. The method according to claim 1, wherein the at least one main device is a smart device.

3. The method according to claim 1, wherein the communication connection is terminated if at least one of the secondary device or the main device does not at least one of receive any activity request from another device or from a user for a predetermined period of time, is inserted into a charging station, is connected to a charging cable, receives a disconnection request from the user or a new secondary device of a same device class is connected.

4. The method according to claim 1, wherein at least a sending function of a wireless communication module of at least one of the secondary device or the main device is deactivated when the communication connection is terminated.

5. The method according to claim 4, wherein also a receiving function of the wireless communication module of at least one of the secondary device or the main device is deactivated when the communication connection is terminated.

6. The method according to claim 1, wherein the main device is prevented from seeking a connection with the secondary device by at least one of means of an identifier other than the setup identifier or means of a static identifier or vice versa.

7. The method according to claim 1, wherein the setup identifier contains at least one of a friendly name an SSID.

8. The method according to claim 1, wherein the wireless communication connection is a Bluetooth connection or a WLAN connection.

9. The method according to claim 1, wherein the setup identifier is generated by means of the main device or the secondary device.

10. The method according to claim 1, wherein the setup identifier is transmitted optically.

11. The method according to claim 10, wherein the setup identifier is encoded in a one-dimensional or multidimensional barcode and the barcode is read in optically for transmission.

12. The method according to claim 10, wherein the secondary device includes a screen and the main device includes a reading unit, wherein the secondary device generates the setup identifier, and wherein for transmission of the setup identifier, the secondary device displays the setup identifier by means of the screen and the main device reads in the setup identifier by means of the reading unit.

13. The method according to claim 1, wherein the main device includes a display and the secondary device includes a reading unit, wherein the main device generates the setup identifier, and wherein for transmission of the setup identifier, the main device displays the setup identifier by means of the display and the secondary device reads in the setup identifier by means of the reading unit.

14. The method according to claim 1, wherein the secondary device is worn on a body of a user.

15. The method according to claim 1, wherein the main device is a smart device including an operating system and an application, the application controlling the setting up of the wireless communication connection.

16. The method according to claim 1, wherein the wireless communication connection is terminated when the secondary device is inserted into a charging station or is connected to a charging cable.

17. A system for at least one of sensing or informing, comprising a main device and at least one secondary device, wherein the system is configured to perform a method having the following steps:

a) setting up a wireless communication connection between one of the at least one main device and one of the at least one secondary device using a setup identifier, the setting up the wireless communication connection including generating the setup identifier, transmitting the setup identifier to at least one of the secondary device or the main device, and establishing the wireless communication connection between the main device and the secondary device by means of the setup identifier, wherein the wireless communication connection is established in that the secondary device or the main device indicates readiness for connection by sending the setup identifier, and the main device or the secondary device, respectively, searches for a device sending the setup identifier to establish the wireless communication connection with this device, and b) discarding the used setup identifier by at least one of the secondary device and or the main device upon or after termination of the communication connection.

18. The system according to claim 17, wherein the system comprises an article of clothing, which is designed to attach the secondary device to a body of a user.

19. The system according to claim 18, wherein the article of clothing has an actuating element which is connected to the secondary device such that it can actuate the secondary device.

20. The system according to claim 17, wherein the wireless communication connection is terminated when the secondary device is inserted into a charging station or is connected to a charging cable.

* * * * *